United States Patent
Makarios et al.

(10) Patent No.: US 6,553,402 B1
(45) Date of Patent: Apr. 22, 2003

(54) METHOD FOR COORDINATING ACTIVITIES AND SHARING INFORMATION USING A DATA DEFINITION LANGUAGE

(75) Inventors: Selene K. Makarios, Mountain View, CA (US); Robert C. Fitzwilson, Atherton, CA (US); Heather L. Downs, Mountain View, CA (US)

(73) Assignee: Nextpage, Inc., Lehi, UT (US)

(*) Notice: Subject to any disclaimer, the term of this patent is extended or adjusted under 35 U.S.C. 154(b) by 0 days.

(21) Appl. No.: 09/305,427

(22) Filed: May 5, 1999

(51) Int. Cl.[7] .......................... G06F 15/16; G06F 17/30
(52) U.S. Cl. .................................. 709/201; 707/104.1
(58) Field of Search ................................ 709/201, 202, 709/203, 213, 214, 215, 310, 312, 313, 314, 315, 316, 317; 707/10, 100, 104.1, 501.1, 513; 717/114, 116, 119

(56) References Cited

U.S. PATENT DOCUMENTS

| | | | | |
|---|---|---|---|---|
| 5,774,660 A | | 6/1998 | Brendel et al. ........ 395/200.31 |
| 5,860,010 A | * | 1/1999 | Attal .......................... 717/137 |
| 5,963,947 A | | 10/1999 | Ford et al. ..................... 707/10 |
| 5,964,841 A | | 10/1999 | Rekhter ....................... 709/242 |
| 5,974,420 A | * | 10/1999 | Lehman et al. ................ 707/10 |
| 6,029,160 A | | 2/2000 | Cabrera et al. ................ 707/1 |
| 6,094,673 A | | 7/2000 | Dilip et al. .................. 709/202 |
| 6,112,242 A | * | 8/2000 | Jois et al. ..................... 707/10 |
| 6,115,715 A | | 9/2000 | Traversat et al. ........... 707/100 |
| 6,119,157 A | | 9/2000 | Traversat et al. ........... 709/220 |
| 6,151,624 A | * | 11/2000 | Teare et al. ..................... 707/5 |
| 6,195,652 B1 | * | 2/2001 | Fish ............................ 707/102 |
| 6,301,584 B1 | * | 10/2001 | Ranger ........................ 345/733 |

OTHER PUBLICATIONS

Sun, J.; Mayfield, J.; "Searching the World–Wide Web Using Signature Files," Computer Science and EE Dept., University of Maryland Baltimore County, Baltimore, MD (no date).

Linda User's Guide & Reference Manual, Version 0.3, *Scientific Computing Associates*, 1/95.

Internet Publication http://www.w3.org/TR/REC-xml, Apr. 3, 1999, pp. 1–37.

A. I. T. Rowstron et al., "Bonita: A set of tuple space primitives for distributed coordination," IEEE System Sciences Proceedings 1997, pp. 379–388.

Widergren et al., "XML for Data Exchange," Power Engineering Society Meeting, Jul. 1999, IEEE pp. 840–842.

* cited by examiner

*Primary Examiner*—Dung C. Dinh
(74) *Attorney, Agent, or Firm*—Skjerven Morrill LLP

(57) ABSTRACT

A widely-used data definition language such as the Extensible Markup Language is used to implement a tuple space-based coordination mechanism. Entries and template entries can represent any type of networked or network-proxied resource, object or service. Using this framework, diverse entry spaces can be aggregated and operated upon as though they were a single large entry space. The flexibility and power of XML constructs can be leveraged to make such aggregation straightforward and efficient.

6 Claims, 1 Drawing Sheet

METHOD FOR COORDINATING ACTIVITIES AND SHARING INFORMATION USING A DATA DEFINITION LANGUAGE

BACKGROUND OF THE INVENTION

1. Field of the Invention

The present invention is directed to a system and method for coordinating activities and sharing information between networked software entities. More specifically, the invention is directed towards implementing data exchange for such purposes using a data definition language.

2. Background of the Related Art

The continuing development of parallel and distributed computing models brings with it issues of how to efficiently share information between networked or linked processors. One possible solution to this problem is Linda, a coordination language (as opposed to a computation language such as C or FORTRAN) proposed by Nicholas Carriero and David Gelernter of Yale University. Linda is based on a logically associative object memory model called a tuple space. A tuple space is a virtual shared memory model which provides interprocess communication and synchronization logically independent of the underlying computer system or network on which it resides. It uses a small number of simple operations on the tuple space to create and coordinate parallel processes which can simply exchange information.

The tuple space is so named because the fundamental data structure which populates it is called a tuple. A tuple is an ordered set of one or more fields with values, e.g., (sweater, wool, xxl-tall). Linda may use pattern-tuples, which are partially-specified tuples denoted with wild cards, e.g., (sweater, wool, ?). There are four basic operations on tuples in tuple space:

for tuple generation, the operation out(tuple) is a non-blocking call (it does not stall program execution) that generates a data tuple (a tuple having static data) having specified values and puts it into tuple space. Control then returns to the invoking program. For example, the operation call
out(shirt, cotton, med)
puts a tuple (shirt, cotton, med) into a given tuple space.

also for tuple generation, the operation eval(tuple) generates a process tuple (a tuple under active evaluation) and returns. For arguments of the tuple which are a function call, conceptually processes are created to evaluate the functions. The results returned by the functions are substituted for the function calls in the tuple, and the tuple is placed into tuple space. For example, the operation call
eval('inventory', ii, inventory(ii))
might create a tuple which calls the function inventory to inventory the number of tuples having a certain field value of i. The result would be a data tuple in the tuple space which has the inventory result as its last field value.

for tuple extraction, the operation in(pattern-tuple) is a blocking call (it may stall program execution) which uses pattern-tuple to retrieve a tuple from the tuple space. The tuple is removed from the tuple-space and is no longer available for use by other processes. If no matching tuple is in the tuple space, the operation will stall until one becomes available. For example, the operation call
in(pants, ?material, large) might look for all "large pants" tuples regardless of the material from which they are made. When and if it matches a tuple in tuple space, the value of the tuple's middle field will be assigned to material.

also for tuple extraction, the operation rd(pattern-tuple) is a blocking call that retrieves a copy of a matching tuple from the tuple space but leaves the original tuple in the tuple space. Thus, it may be thought of as a non-destructive version of in.

The Linda paradigm is both powerful and elegant, subsuming and organizing in a clean way some important issues in parallel and distributed computation and coordination. It has demonstrated its utility in a variety of applications involving coordinated software entities. For example, Linda forms the basis for a number of network device attachment and operation models. In particular, Linda features have been incorporated into several Java-based systems such as JavaSpaces, which forms a part of Sun Microsystems' Jini system; T Spaces from IBM Almaden Research laboratories; Java Paradise from Scientific Computing Associates, and Jada from the University of Bologna.

Unfortunately, these various Java implementations of Linda are not compatible with one another in the particulars of the entries which they store in their respective tuple spaces. This diminishes the potential for harmonious inter-operation between systems speaking the various different dialects of Linda. Even if the different derivative implementations were mutually compatible, they all assume a language-based tuple space of Java objects and are not compatible with, e.g., non-Java based implementations.

SUMMARY OF THE INVENTION

With the above problems of the prior art in mind, it is an object of the present invention to provide a system and method for coordinating activities and sharing information among networked software entities.

It is a further object of the present invention to provide a unifying framework and standard for coordination and information sharing among networked software entities.

It is yet another object of the present invention to provide a system and method for combining networked tuple-spaces into larger distributed tuple-spaces without limit by exploiting the uniform representation which all tuple spaces share.

The above objects are achieved according to a first aspect of the invention by applying a widely-used data definition language such as the Extensible Markup Language (XML) to the domain of tuple space-based coordination mechanisms. With XML, for example, entries and template entries (similar to tuples and pattern tuples in Linda) are instances of XML Document Type Definitions (DTDs). These entries can represent any type of networked or network-proxied resource, object or service. Using this framework, diverse entry spaces can be aggregated and operated upon as though they were a single large entry space. The flexibility and power of XML constructs can be leveraged to make such aggregation straightforward and efficient.

BRIEF DESCRIPTION OF THE DRAWINGS

These and other objects, features, and advantages of the present invention are better understood by reading the following detailed description of the preferred embodiment, taken in conjunction with the accompanying drawings, in which.

DETAILED DESCRIPTION OF THE PRESENTLY PREFERRED EXEMPLARY EMBODIMENT

Figure 1:
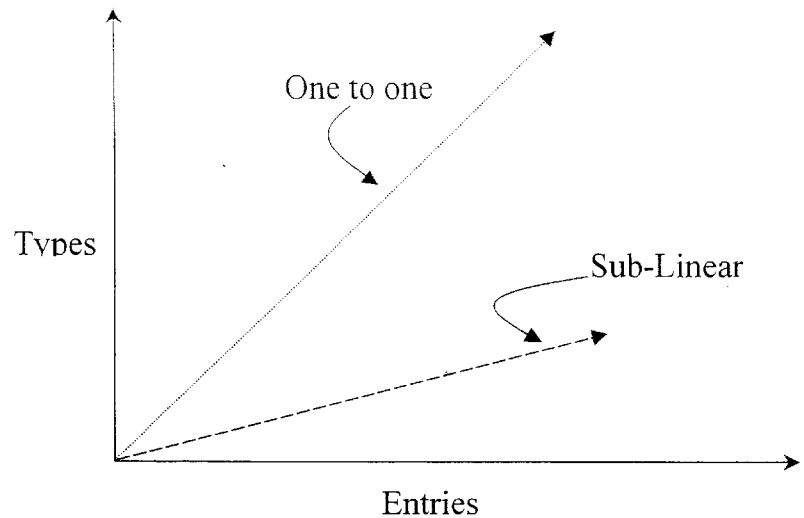
FIG. 1 is a graph showing sub-linear scaling of element types with respect to element number.

For brevity and ease of explanation, only those aspects of the XML language relevant to explaining how to make and use the present invention are described herein. Additional details on XML may be found, e.g., in the XML Specification 1.0 found at, inter alia, http://www.w3.org/TR/1998/REC-xml-19980210 and incorporated herein by reference. Of course, the present invention is not limited to the use of XML, and any other programming language having suitable characteristics as described below, e.g., SGML, may be used in its place.

Further, those skilled in the art will readily understand that the present invention is preferably implemented as software executed by multiple processors in a networked computer system which causes the computers to generate appropriate electrical signals as is known in the art. For ease of understanding, the preferred embodiment will be explained with a focus on the software processes and the data they manipulate, rather than on the networked hardware and electrical signals themselves.

In a preferred embodiment of the present invention, the analog of the Linda tuple is called an entry, and entries populate entry spaces (similar to tuple spaces). An entry is implemented as an instance of an XML DTD and has the general format <entry-name>
  <field-name-1> field-value-1 </field-name-1>
  <field-name-2> field-value-2 </field-name-2>
</entry-name>

For example, an entry in an embodiment of the present invention used, e.g., in a clothing sales system might look like <lot-available>
  <item> sweater </item>
  <fabric> wool </fabric>
  <size> xxl-tall </size>
</lot-available>

A field in an entry might have a nested structure:

<lot-available>
  <item> sweater </item>
  <fabric> wool </fabric>
  <size> <waist> 34 </waist>
    <inseam> 33 </waist> </size>
</lot-available>

The operations which may be performed on an XML Space are:

write(entry)
read(template)
read-if-exists(template)
take(template)
take-if-exists(template)

Here, write(entry) writes an entry to the entry-space;

read(template) performs a blocking, non-destructive copy of an entry matching template (templates are discussed in greater detail below); read-if-exists(template) performs a non-blocking, non-destructive copy of an entry matching template;

take(template) performs a blocking, destructive copy of an entry matching template; and take-if-exists (template) performs a non-blocking, destructive copy of an entry matching template.

A template is a generalization of an entry in which some of the tagged fields may be under-specified or unspecified. For example, a software entity wishing to locate available lots of woolen sweaters in any size in the above-described embodiment might call read-if-exists(template) with the following template:

<lot-available>
  <item> sweater </item>
  <fabric> wool </fabric>
  <size> * </size>
</lot-available>

The wildcard * in a field will match any specific value in an analogous field in the XML Space. More precise means of pattern-matching such as regular expressions can also be used, as will be readily apparent to those skilled in the art.

The example above was given in connection with articles of clothing for explanation purposes; however, it will be apparent to those skilled in the art that the applications of entries according to the present invention are numerous if not limitless. For example, entries can represent any sort of networked or network-proxied resource, object, or service. An embodiment could provide agent synchronization services, electronic resource-transfer services, notification services, or virtually anything having to do with distributed coordinating entities that could make use of XML data.

Once entries are in an entry space, there must be some means for easily, quickly and efficiently accessing them. Such techniques according to the preferred embodiment of the present invention are based upon entry types. The type of an entry is a means of describing the entry with some degree of generalization and can be implemented in various ways. For example, the type of an entry can be considered to be characterized by its DTD, or more restrictively by the particular nested structure of its XML tags (without regard to field values). The latter characterization is more restrictive in the sense that two entries which have the same type with respect to the latter characterization will also have the same type with respect to the former characterization, but not necessarily vice-versa. The preferred choice of representation will be application-dependent and apparent to those skilled in the art.

One technique for addressing entries in an entry space also provides a straightforward means of aggregating disparate entry spaces. It advantageously recognizes that the number of different types of entries in an aggregated entry space will scale sub-linearly with the total number of entries, as shown conceptually in FIG. 1. This basically means that the number of different types of things about which networked communities of entities will want to communicate grows more slowly, in the computational-complexity sense, than the total volume of things. Therefore, doubling (for example) the number of things in an entry space may only increase the number of distinct types by a logarithmic factor or even less. The exact rate of increase will, of course, be application-dependent.

For example, in the clothing example developed above, there are basically a limited number of types of clothing, e.g., shirts, pants, socks, etc. If the number of entries in an entry space was doubled, the number of entry types is likely to increase little, if at all, since most if not all of the new entries will represent a type of clothing probably already present in the entry space.

Figure 2:
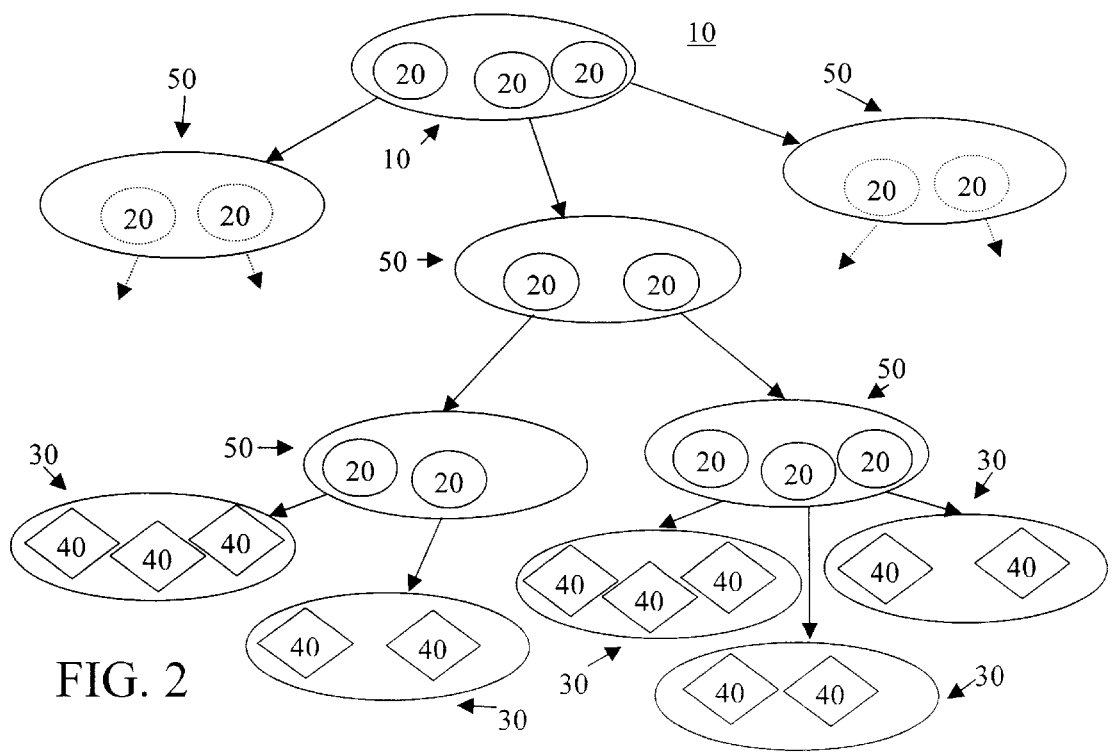
FIG. 2 is a tree diagram showing the structure of an element universe according to a preferred embodiment of the present invention.

This principle can be leveraged by implementing a networked hierarchy 10 (called an entry universe) of increasingly condensed representations of sets of entry types 20 present in an entry space 30 as shown in FIG. 2. If an entity, e.g., a process, is seeking a particular entry type 20, and an entry 40 of that type is not present in a given entry space 30, the entry universe 10 is traversed upwards (in the direction of increased generality) to a higher-order node called a metaspace 50 containing a generalized description of the nodes below it to seek a group of entry spaces 30 in which an entry 40 of the desired type 20 resides. Then, from that point the entry universe 10 is traversed downwards (in the direction of increased specificity) to find the particular entry space 30 and entry 40 of interest.

As seen in the Figure, leaf nodes in the entry universe are entry spaces 30 containing entries 40 of interest to various networked entities. Each leaf node is connected to a metaspace 50 in the next higher layer of the entry universe 10. Each metaspace 50 itself is (for first-level metaspaces 50) a tuple-space comprising a collection of pairs each mapping a particular child entry space 30 to a condensed representation of the set of entry types 20 that it contains, or (for higher-level metaspaces) a tuple-space comprising a collection of pairs each mapping a particular metaspace 50 in the next lower level to a condensed representation of the set of entry types 20 which it references. Since the function of the metaspaces is to support aggregation of the XML spaces and not to support explicit XML space retrievals, the metaspaces need not be implemented in XML, and various appropriate programming paradigms will be readily apparent to those skilled in the art.

The condensed representations of sets of entry types 20 in the entry spaces 30 are created in a fashion analogous to the creation of digital signatures used for document retrieval. In this latter process, a set of terms (words or other important syntactic elements) is extracted from a document and each extracted term is hashed into a fixed-length bit-vector known as a signature. The signatures for all the terms are superposed and bitwise-OR'ed together to form a signature for the document. Document signatures are stored for each member of a corpus of documents, thus representing essentially a (lossy) compressed version of that corpus. For further information, see, e.g., Sun et al., "Searching the World-Wide Web Using Signature Files", incorporated herein by reference.

In order to retrieve a document containing a particular term, the digital signature of that term is created, and compared with the stored document signatures. Any stored signature which "covers" the bits in the term-signature (i.e., has bits set for all the positions where the term-signature does) is a high-probability candidate for containing the term. The term is then compared against the document itself to verify its presence.

In the preferred embodiment of the present invention, the "document" role is played by the collection of entries 40 contained within a given entry space 30 (in first-level metaspaces 50) or by the collection of condensed entry types 20 in metaspaces 50 on the next lower level, and the "terms" which are hashed into signatures are the entries 40 or entry types 20. Thus, to find an entry space 30 containing a particular entry type 20, that entry type 20 is first hashed into a signature which is then compared with the signatures stored in the metaspace 50. A metaspace 50 with a signature subsuming the bits of the entry type 20 is a high probability candidate for containing that type 20.

Metaspaces 50 aggregate to form higher-level metaspaces 50 in the entry universe 10 in the following manner. Nominally, one might create the composite signature for a collection of metaspaces 50 by simply superposing the signatures of each member of the collection. From a practical standpoint, this would produce an increasing probability of false hits when searching (via signatures) for entry spaces or metaspaces 50 which contain a particular entry type 20.

To maintain a constant false-hit rate higher in the entry universe 10, the length of a signature in a metaspace 50 is positively correlated to its level. That is, the signature length of a metaspace 50 closer to the top entry universe 10 node is longer than that of a metaspace 50 farther away from the top entry universe 10 node. Thus, all the signatures in a given metaspace 50 should be converted into longer signatures in an information-preserving fashion. Essentially, the signatures need to be re-sampled, and the most sound means to do this is by mapping them via Fourier methods into the spatial-frequency domain. There, the transforms of the signatures are compressed into a smaller range of spatial frequencies, and then inverse Fourier transforms are computed based on target bit-vectors which are longer than the original ones. Once this has been accomplished, the signatures for all of the metaspaces 50 are superposed to produce a signature for use in the next higher metaspace 50. This process repeats recursively upwards to the top of the hierarchy. In this way, it is seen that a rate of sampling the mapped descriptions is dynamically determined based on characteristics of the entry universe. Also, although the Fourier technique is widely known in the art, other appropriate techniques such as simple resampling can also be used.

The particular expansion factor for the signature width at each level of the entry universe 10 depends on the growth in the number of different types of entries 30 represented within a metaspace 50. The optimal expansion factor could be determined dynamically based on the characteristics of the collection at any particular time.

It is not necessary for all immediate children of any particular metaspace 50 in the entry universe 10 to pass upward signatures of the same size. The metaspace 50 may normalize all of the received signatures to be of the same length, for composition of a signature to pass up to its parent, via the spatial frequency methods described above. It is only necessary, when handling searches for particular entry types propagating up the entry universe 10, that each individual entry signature which is propagated be normalized in the same way as was the signature of the corresponding child metaspace 50.

Using this technique for accessing entry spaces 30, one can see how it easily lends itself to the aggregation of disparate spaces. For example, each of the entry spaces 30 may be on a separate networked computer system within the entry universe 10, or several may be resident on different systems. Due to the hierarchical nature of the entry universe 10 and the transformation of element type signatures between levels, the aggregated spaces appear as a single homogenous entry space to a process or other entity accessing it. This further increases the flexibility and wide applicability of the entry space paradigm.

The present invention has been described above in connection with a preferred embodiment thereof; however, this has been done for purposes of illustration only, and the invention is not so limited. Indeed, variations of the invention will be readily apparent to those skilled in the art and also fall within the scope of the invention.

What is claimed is:

1. A method of sharing data between a plurality of processors in communication with one another comprising:

using a first computer to generate an entry using an extensible markup language, the entry comprising a plurality of fields, each of the fields having a value;

using a computer to store the entry in an entry universe;

using a second computer to read the entry from the entry universe;

wherein the entry universe comprises:
a plurality of entry spaces; and
a plurality of metaspaces;
wherein each one of a first group of the metaspaces is associated with multiple ones of the plurality of entry spaces and contains a generalized description of entries in its associated entry spaces; and
each one of a second group of the metaspaces is associated with multiple ones of the plurality of first group of metaspaces and contains a generalized description of descriptions in its associated first group metaspaces.

2. The method of claim 1, wherein the generalized description in each second group metaspace is longer than the generalized description in each of its associated first group metaspaces.

3. The method of claim 2, further comprising:
using a computer to Fourier map generalized descriptions of first group metaspaces associated with a second group metaspace to a spatial frequency domain;
using a computer to sample the mapped descriptions into a smaller range of spatial frequencies than in the mapped description;
using a computer to inverse map the sampled descriptions; and
using a computer to superpose the inverse mapped descriptions to obtain the generalized description of the second group metaspace.

4. The method of claim 3, wherein a rate of sampling the mapped descriptions is dynamically determined based on characteristics of the entry universe.

5. The method of claim 3, further comprising using a computer to normalize generalized descriptions of the first group of metaspaces associated with the second group metaspace.

6. A method of accessing an entry in an entry universe comprising:
causing a computer to access an entry space in the entry universe using a template;
when the entry space does not contain an entry matching the template, causing a computer to access a first metaspace associated with the entry space and containing generalized descriptions of entry spaces associated therewith;
when the template matches a generalized description in the first metaspace, accessing an entry space corresponding to the generalized description; and
when the template does not match a generalized description in the first metaspace, accessing a second metaspace containing a generalized description of the first metaspace.

\* \* \* \* \*